Figure 1:
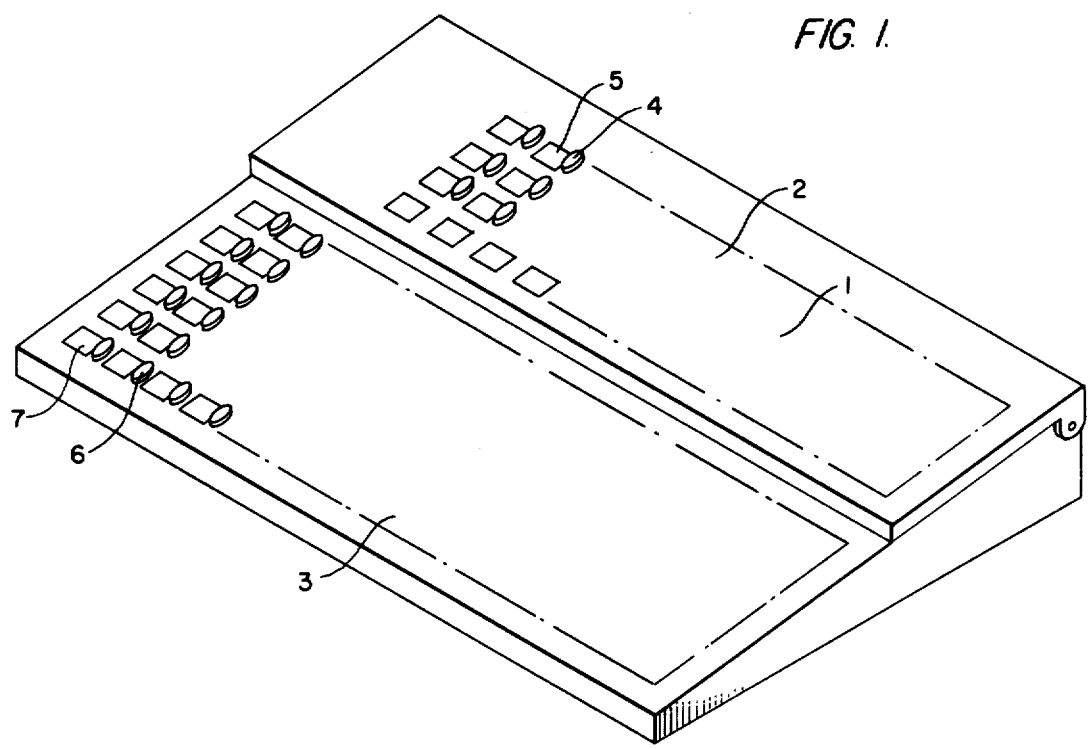

United States Patent [19]

Urata et al.

[11] 4,381,500
[45] Apr. 26, 1983

[54] KEYBOARD APPARATUS

[75] Inventors: Yoshihito Urata, Katano; Hideyuki Kubo, Suita; Toshiharu Sasaki, Kawanishi, all of Japan

[73] Assignee: Matsushita Electric Industrial Co., Ltd., Osaka, Japan

[21] Appl. No.: 233,647

[22] Filed: Feb. 11, 1981

[30] Foreign Application Priority Data

Feb. 13, 1980 [JP] Japan .............................. 55-17049
Oct. 1, 1980 [JP] Japan ............................. 55-138166

[51] Int. Cl.³ ............................................... G08C 9/08
[52] U.S. Cl. .......................... 340/365 VL; 340/365 R; 340/712; 178/17 C; 179/90 K; 312/127; 235/145 R; 400/478; 340/815.20; 340/815.08
[58] Field of Search ............ 340/365 VL, 365 R, 711, 340/712, 525, 366 E, 378.5, 378.6, 378.1, 378.2, 378.3; 400/479, 485, 477, 478; 178/17 C; 179/90 K; 235/145 R, 145 A, 146; 312/117, 119, 126, 127

[56] References Cited

U.S. PATENT DOCUMENTS

| | | | |
|---|---|---|---|
| 3,200,375 | 8/1965 | Lutz | 340/365 VL |
| 3,560,964 | 2/1971 | Bedell et al. | 340/365 VL |
| 4,279,021 | 7/1981 | See et al. | 340/365 VL |

Primary Examiner—Marshall M. Curtis
Assistant Examiner—Donnie Lee Crosland
Attorney, Agent, or Firm—Wenderoth, Lind & Ponack

[57] ABSTRACT

A keyboard apparatus has item keys for data entry, and select keys for changing the display of input data written on sheets, according to the item keys, and a changer for the sheets stored in a cartridge, which separates the sheets in the cartridge into two groups, the sheets from one group being moved in the cartridge to a display position and the sheets from the other group being held in a non-display position. A cartridge holds the sheet to be displayed on the top of the stack of sheets remaining in the cartridge and a translator moves the sheets in the cartridge horizontally to the display position.

5 Claims, 17 Drawing Figures

U.S. Patent   Apr. 26, 1983   Sheet 1 of 8   4,381,500

KEYBOARD APPARATUS

This invention relates to a keyboard apparatus, which makes it possible to carry out data entry by operation of a key corresponding to the desired item.

It is well known that these keyboards are very easily operated, but need a lot of key sets, consisting of keys and display of input data which is to be entered by the keys. Thus such prior art apparatuses become large, and it becomes perplexing to find the desired one among the many displayed items.

However, in conventional apparatuses, there are several ways for removing such disadvantages. For example, cards or sheets, on which items for data input are written, are located in positions corresponding to the positions of the keys in the key array, are provided and can be changed as desired by a manual operation or automatic operation. But for manual operation, this is not speedy, as is well known. And in a conventional apparatus operated automatically, sometimes this feature of changing the display card lacks reliability.

It is therefore an object of the invention to provide a reliable and improved keyboard apparatus.

Another object of the invention is to provide such an apparatus which is able to deal with many display sheets.

A further object of the invention is to make it easy to handle the cartridge wherein the display sheets are stored.

These objects are achieved according to the invention by providing a keyboard apparatus which comprises: key switches consisting of item keys for carrying out data entry and select keys for changing the display of input data corresponding to said item keys; display means for showing the input data corresponding to said item keys, which comprises sheets on which said input data are written already; a cartridge means comprising a tray means for storing said sheets in piles; selecting means for separating said sheets in said tray means into two groups, the first group being moved out and the second group remaining in said tray means; and translating means for moving said tray means to a first position where said sheets are separated by said selecting means, and to a second position where said sheets are displayed.

Preferably in this apparatus, said selecting means comprises: tag means which is located at the front or rear side of said sheets, arranged in order of stacking; and separating means for holding one of said tag means out of said tray means. Advantageously, the tray means has guiding means for said sheets, and one of said guide means, corresponding to said tag means of the sheets, is arranged in the center of sheets, and said tag means and separating means are arranged on either side of said guide.

Further, said cartridge means advantageously consists of a casing means for movably housing said tray means, which casing means has mounted thereon displaying means for said select keys; and a tray means for storing said sheets in piles. More advantageously, the tray means has guiding means for said sheets, and one of said guiding means, corresponding to said tag means of sheets, is arranged in the center of sheets, and said tag means and separating means are arranged on either side of said guide.

Figure 4A:
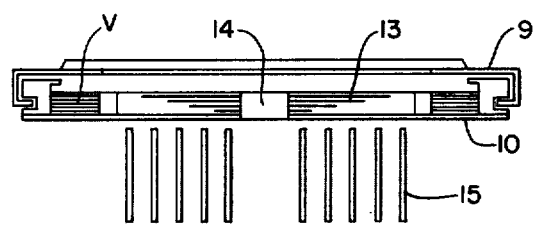
Figure 4B:
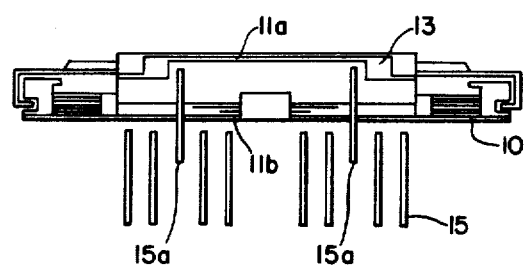
Figure 2:
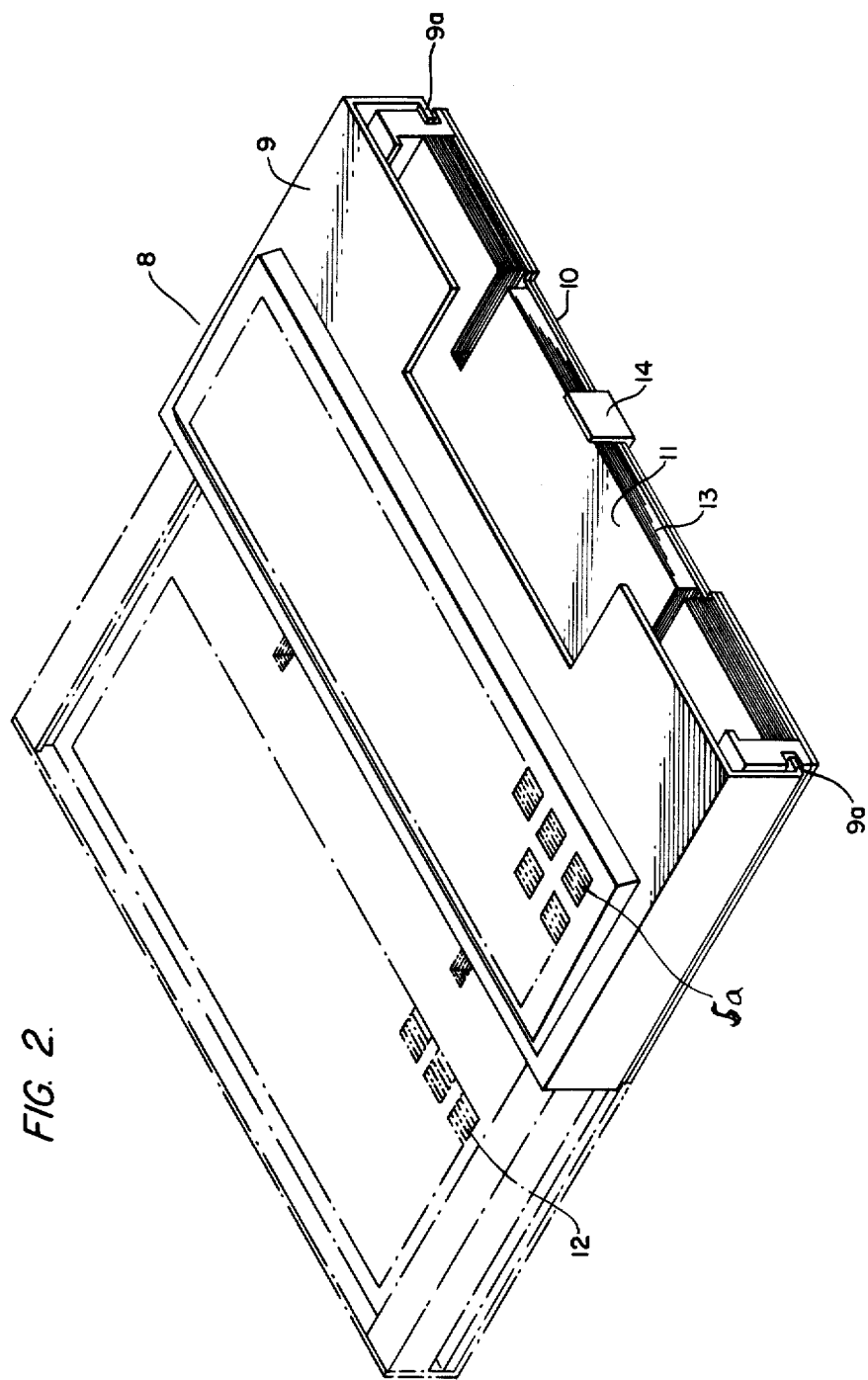
Figure 3:
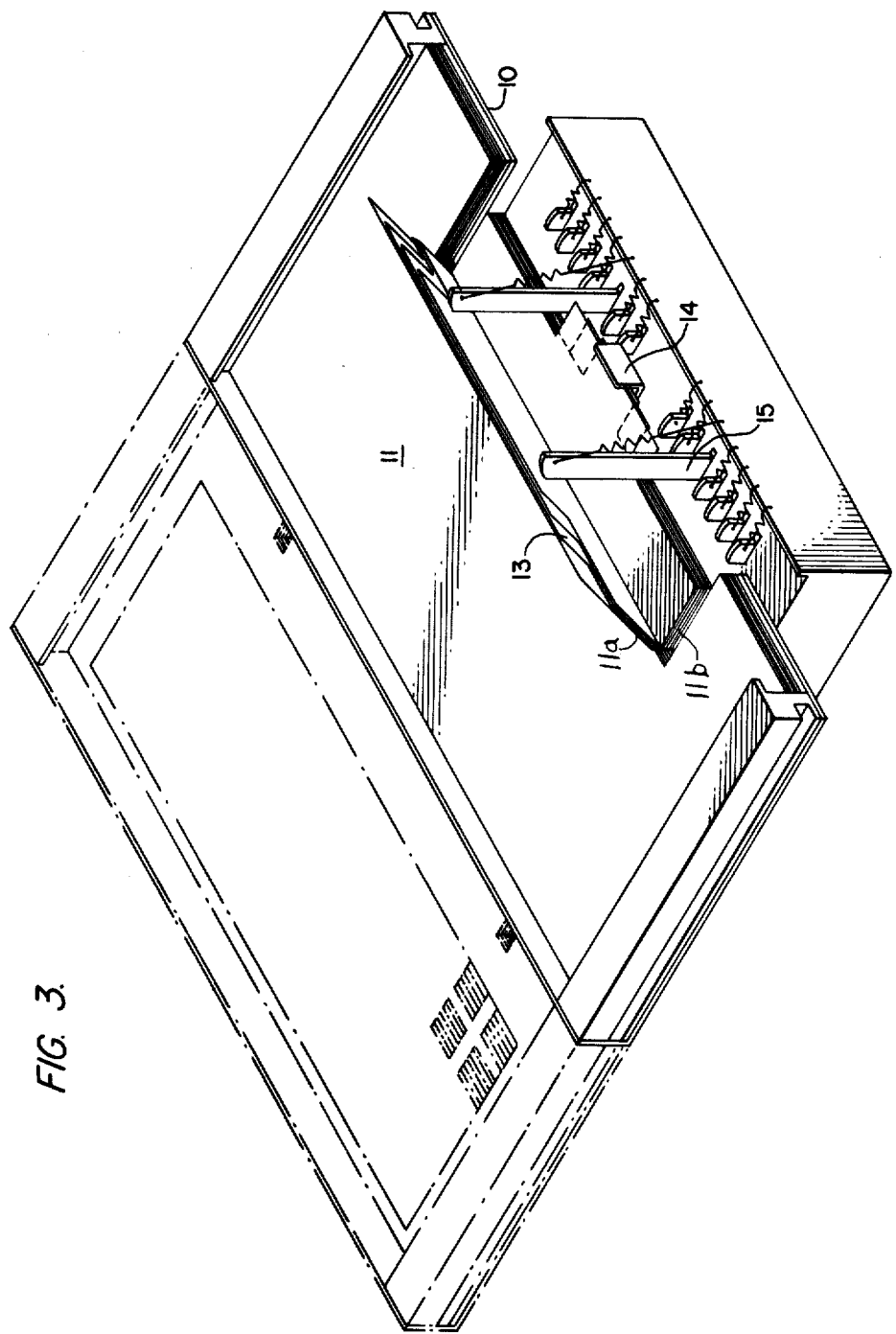
Figure 5A:
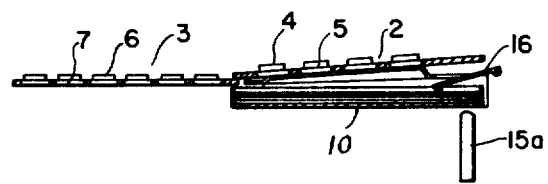
Figure 5B:
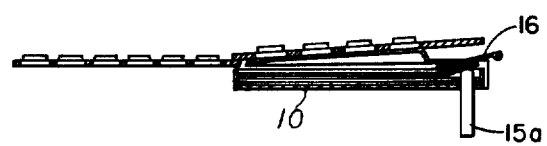
Figure 5C:
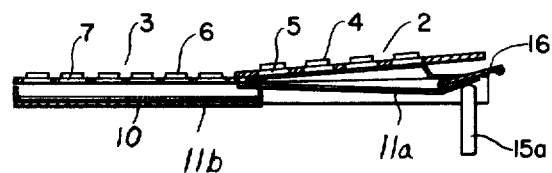
Figure 6:
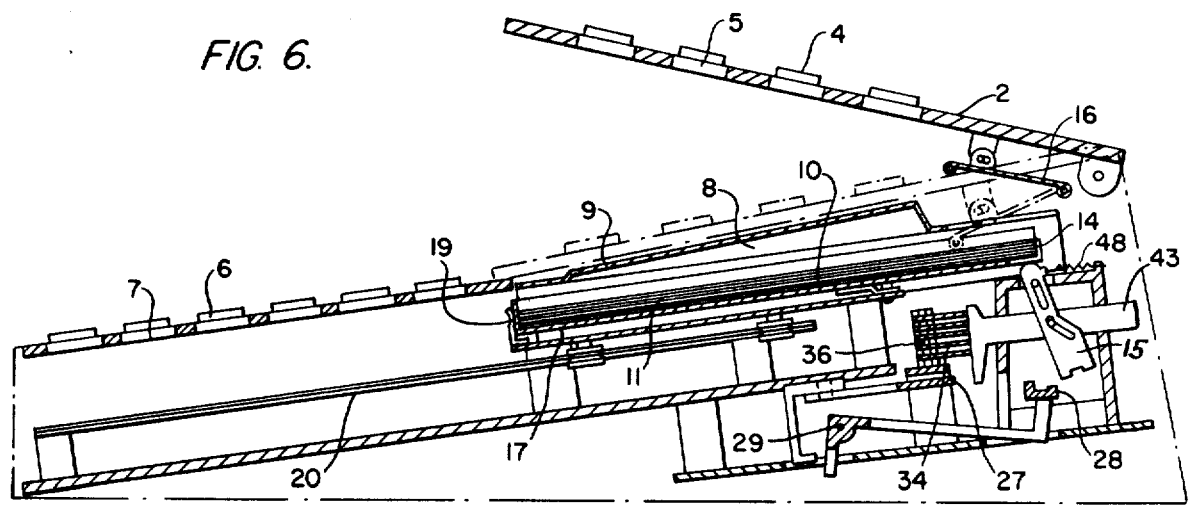
Figure 7:
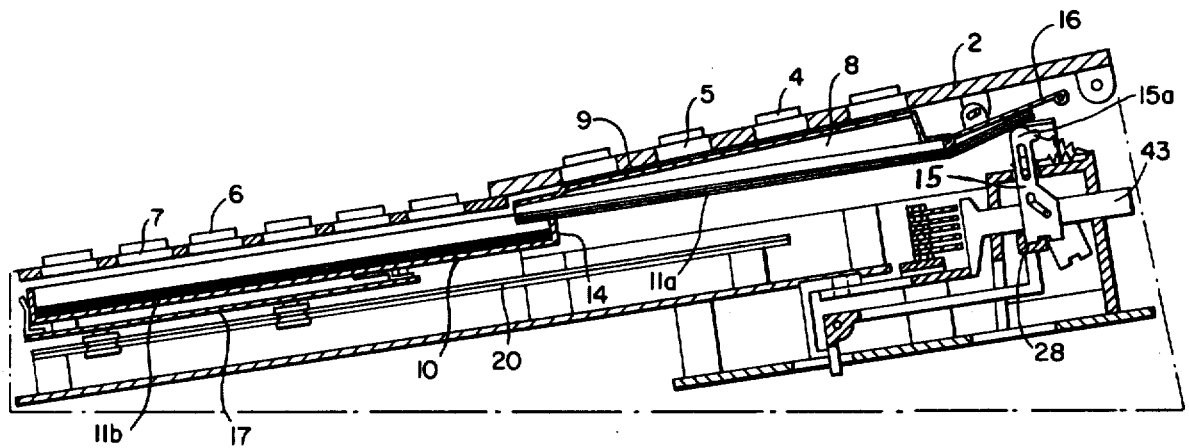
Figure 8:
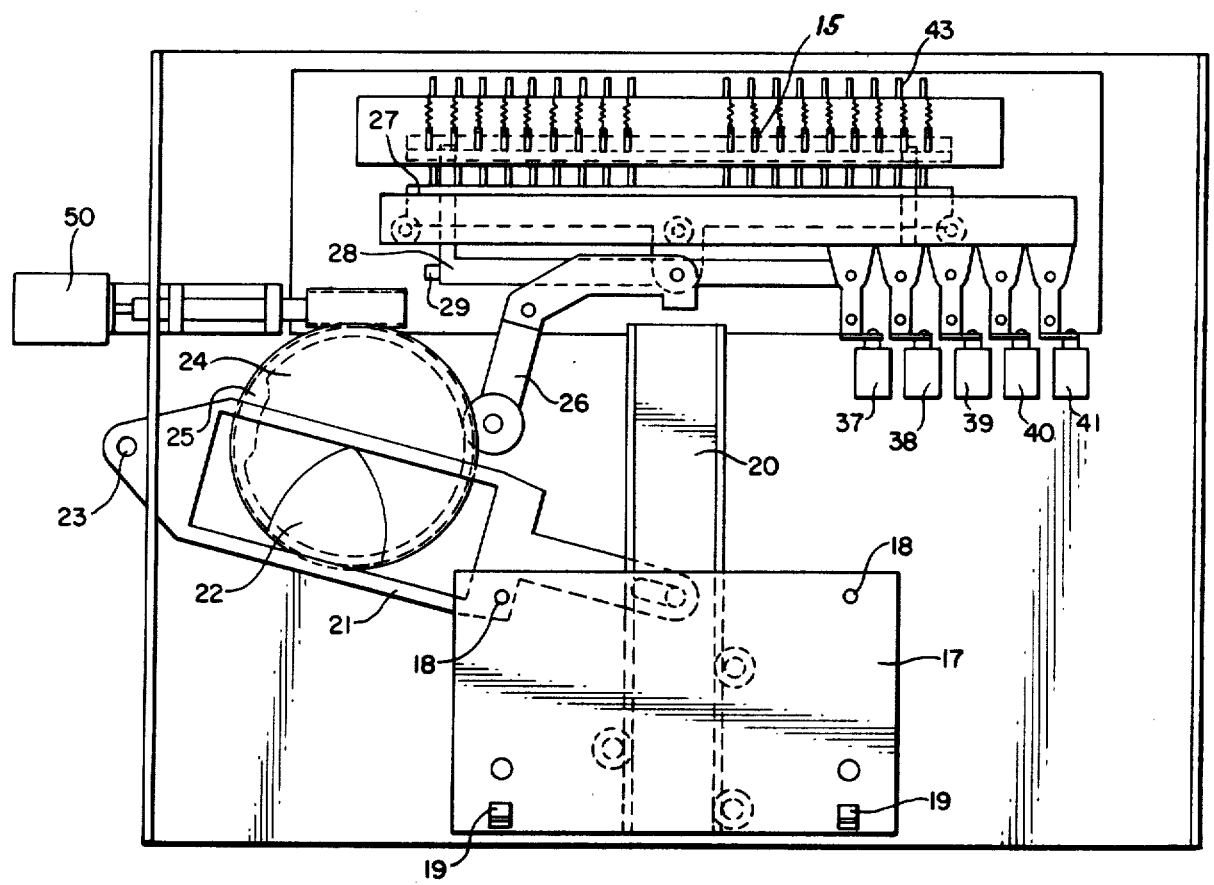
Figure 9:
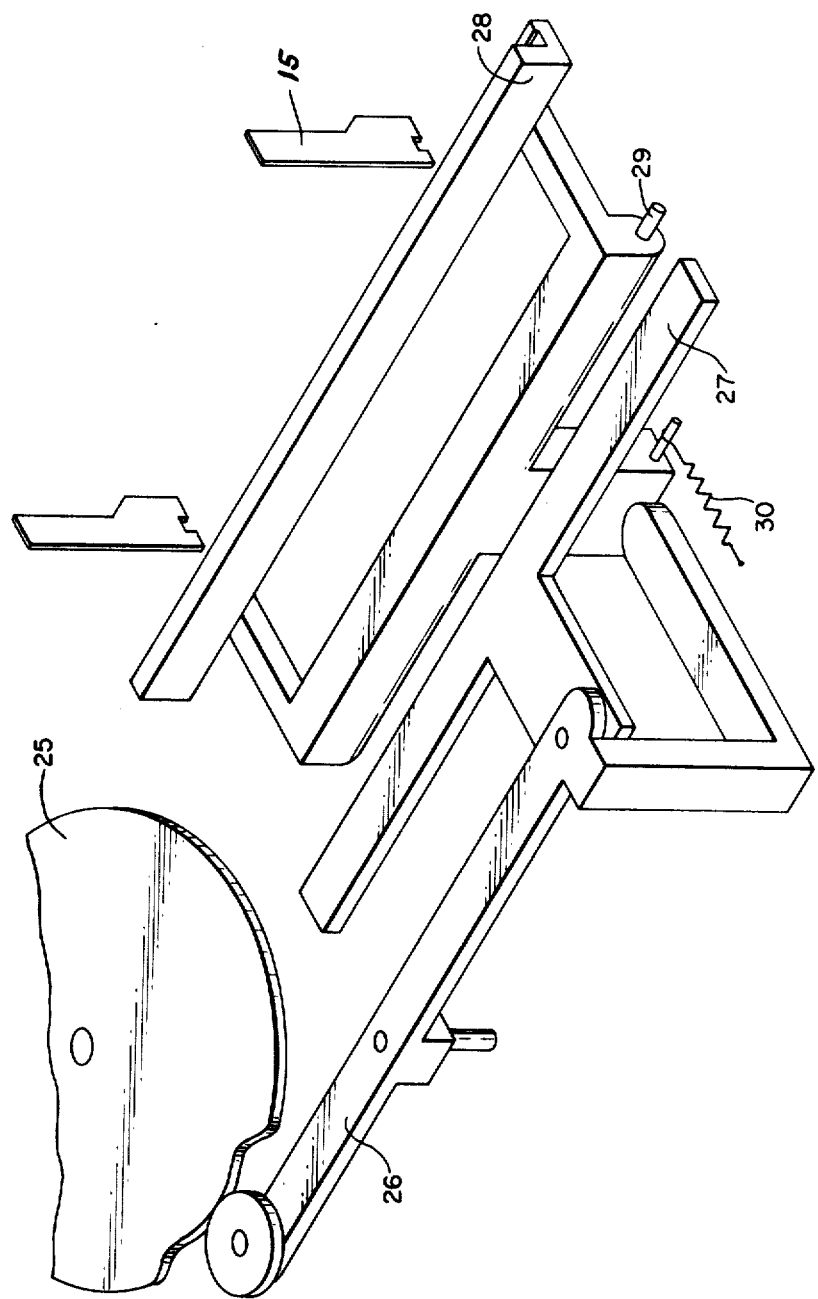
Figure 10:
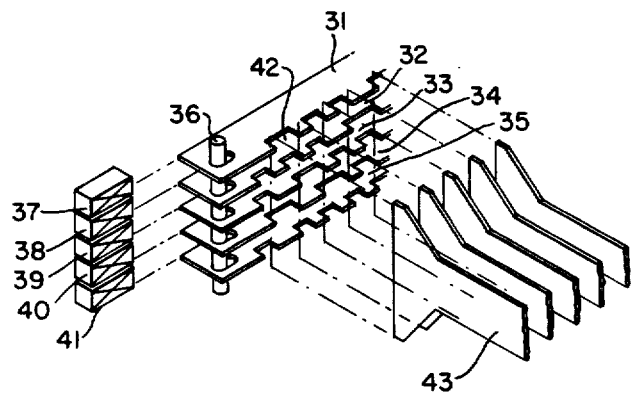
Figure 11:
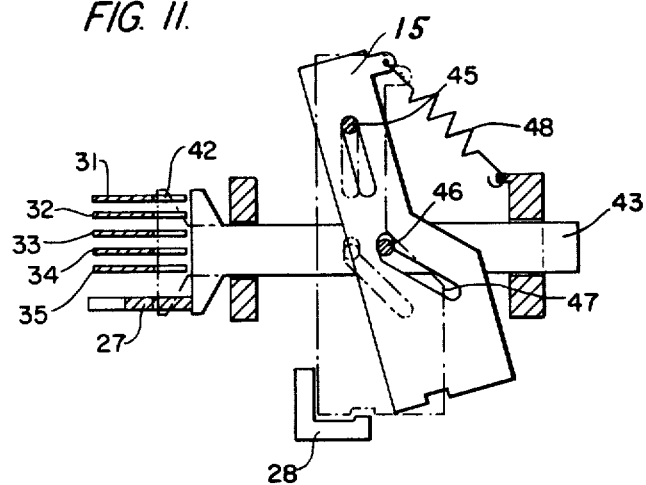
Figure 12:
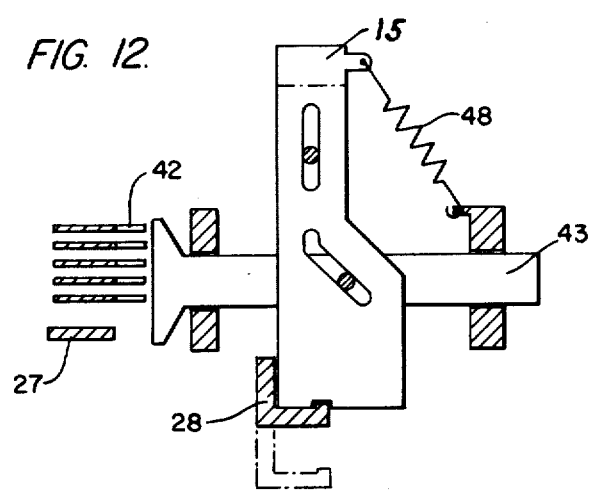
Figure 13:
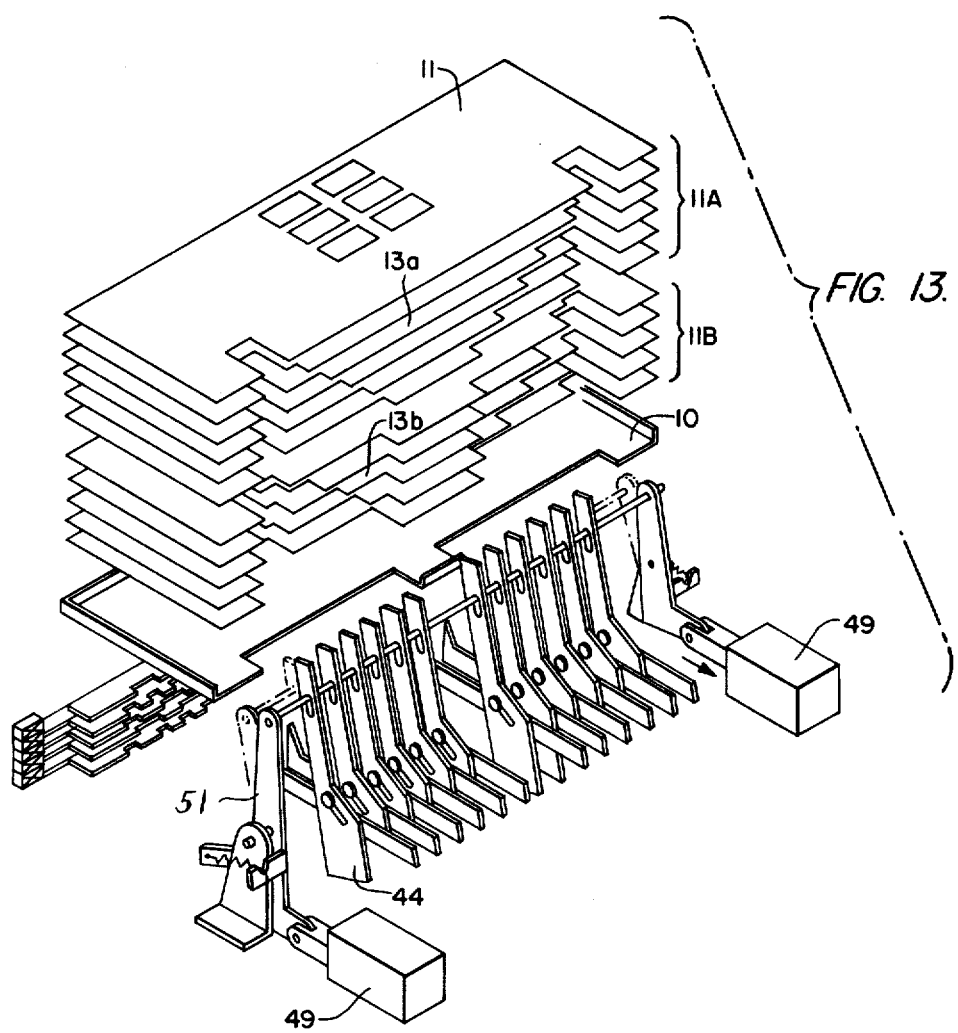
Figure 14:
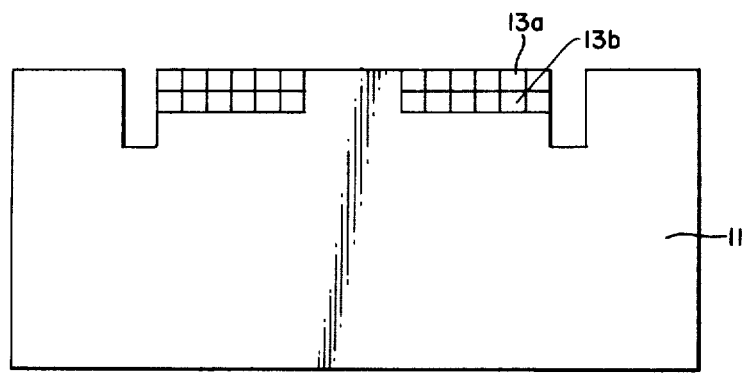

These objects and features of the invention will become apparent upon considering the following detailed description in conjunction with the accompanying drawings, in which:

FIG. 1 is a perspective view of a keyboard apparatus;
FIG. 2 is a perspective view of a cartridge;
FIG. 3 is a perspective view of the cartridge and a selecting means;
FIGS. 4a and 4b are rear views of the cartridge for explaining the operation of selecting sheets;
FIGS. 5a-5c are sectional side views of the cartridge for explaining the operation of selecting the sheets;
FIG. 6 and FIG. 7 are sectional side views of the keyboard apparatus;
FIG. 8 is a top plan view of the keyboard apparatus;
FIG. 9 is a perspective view of a main portion of the selecting means;
FIG. 10 is a perspective view of logic plates and detector pins for explaining logical movement of the detector pins;
FIG. 11 and FIG. 12 are partially sectioned side views of the selecting means and the logic plates for explaining the operation of the selecting means;
FIG. 13 is an exploded perspective view of another example of selecting means and another example of sheets; and
FIG. 14 is a bottom plan view of a sheet of FIG. 13.

Referring now to FIG. 1, a keyswitch panel 1 comprises a select key panel 2 and an item key panel 3. These key panels consist of select keys 4, item keys 6, and transparent windows 5 and 7 for displaying the set of data items selected of the item entered by these keys respectively.

In FIG. 2, cartridge 8 consists of a case 9 open on the bottom and a tray 10. The tray 10 is able to slide into and out of the case 9 guided by a holder 9a. Sheets 11 are stored in the tray 10 in piles or stacks. On the sheet surfaces are written sets of items 12 for being displayed. Every sheet has thereon a tab means 13 as shown in FIGS. 2 and 3. These tab means are successively maneuver on either side of the rear guide 14 of the tray and starting with the tab means on the top sheet and on successively lower sheets. Data set descriptions 5a are provided on the top of the case 9 in positions corresponding to the windows 5.

Separator pins 15 are provided corresponding to said tab means. Therefore, as will be seen in FIGS. 3, 4a and 4b, when a pair of separator pins 15a corresponding to a given tab means 13 is thrust upward, sheets 11 are separated into two groups, the first group 11a having the tab means 13 thrust up and the second group 11b having the tab means remaining in the tray means. The sheets 11a of the first group are held tightly between the separator pins 15a and a pressure plate 16 (see FIG. 5b).

Then, as illustrated in FIGS. 5a-5c, tray 10 is moved laterally to a second position under an item key panel 3, as shown in FIG. 5c from a first position under the select key panel 2, as shown in FIG. 5a. The sheets in group 11b which are not held are carried along in tray 10. At the second position in FIG. 5c, the sheet next below the sheet to which the pins 15a correspond, i.e. the top sheet in group 11b, is displayed through transparent windows 7 of the item key panel 3. It will be understood that when another pair of separator pins is thrust up the surface of the sheet next below the sheet to which such pins correspond will be displayed through windows 7.

FIG. 6 shows the select key panel 2 in the open position for setting the cartridge 8 in the apparatus. When the select key panel 2 is shut off, the apparatus is set in.

Then, the tray 10 of a cartridge 8 is mounted on the sliding member 17 through the open bottom of the case 9, and is held thereon by means of set pins 18 (see FIG. 8), and pressure springs 19. The sliding member 17 slides on a sliding bed 20 and has a driving arm 21 connected thereto as shown in FIG. 8.

The driving arm 21 is moved in a reciprocating motion by a cam means 22 and is pivotally mounted on a shaft 23. The cam means 22 is mounted on a wheel 24 which in turn is rotated by a motor 50. Thus, when the motor is operating, the tray 10 is driven between the first position and second position, resting for a time at either position due to the operation of the cam means 22. Further, as shown in FIGS. 8 and 9, the wheel 24 has another cam means 25 thereon for driving an arm 26. The arm 26 is connected to a reset plate 27. The arm 26 also rotates a lifting bar lever 28a around a shaft 29 which in turn causes lifting bar 28 to rise, and the lever 28a.

Now, referring to FIGS. 10, 11 and 12, logic plates 31, 32, 33, 34 and 35 are mounted on a pin 36 for movement transverse to a plurality of side by side detecting pins 43, and are driven by solenoids 37, 38, 39, 40 and 41, respectively. The logic plates have logic grooves 42 therein, corresponding to each detecting pin 43. The logical grooves are arranged so that a pair of detecting pins can be engaged in selected ones of said grooves when the solenoids are driven in the logical combination. For example, employing five sets of logic plates and solenoids, one can make $2^5 = 32$ combinations, and so that one can select one pair of detecting pins from among the thirty two pairs of detecting pins.

Separator pins 15, mounted on a shaft 45 extending through vertical slots in the pins 15, are connected respectively to the corresponding detecting pins 43 by pins 46 extending through angled slots 47 in the pins 43, and are pulled downward by springs 48, respectively. Thus, by virtue of the spring 48 and the angled slot 47, each detect respectively. So, by virtue of the spring 48, the detecting pin 43 is urged toward the logic plates as shown in FIG. 11. Then, when the logic plates are driven by the solenoids, a pair of detecting pins 43 enters the grooves 42 which have been moved opposite the desired detecting pins 43, and a pair of separator pins 15 are shifted toward the lifting bar 28 as shown in chain lines in FIG. 11. Thus, when the lifting bar 28 is moved up, the pair of separator pins selected are thrust up, and sheets are separated as illustrated in FIG. 3. Thereafter, the detecting pins 43 are returned to their initial positions. Then, logic plates are thus reset for the next sheet changing movement. The select keys 4 are connected to motor 50 and each is connected to energize a particular combination of solenoids 37, 38, 39, 40 and 41 to select one pair of separator pins 15.

The apparatus operates as follows:

1. A desired select key 4 is pushed and the motor 50 rotates and solenoids 37–41 are energized in a particular logical combination for the desired sheet.

2. While the motor rotates, the tray 17 is moved from the second or display position of FIG. 7 to the first position as shown in FIG. 6, and rests during further rotation of cam 22.

3. Reset plate 27 is retracted by the operation of the cam 25, and the lifting bar is moved downward by spring 30 lowering the pair of separator pins 15 which have previously been thrust up. Thus, the sheets in group 11a re allowed to drop downward back into the tray.

4. A different pair of separator pins 15 corresponding to the select key 4 which has been pushed is thrust up by the movement of the lifting bar 28 upon further rotation of the cam 25. Then sheets in a new group 11a are separated from the sheets in new group 11b which remain in the tray.

5. The tray again moves, after the end of the rest at the first position, back to the position of display, and the motor is stopped.

Referring to FIGS. 13 and 14, there is shown a modification of the invention. It will be seen that the sheets have two sets of tag means 13a and 13b located thereon which are offset. Here the set 13a projects beyond the set 13b. The separator pins 15 are shifted by pivoting of levers 51 by the operation of solenoids 49 so as to engage one or the other sets of tag means.

From the foregoing description and drawings, it will seen that this invention provides a keyboard apparatus which is operated easily and speedily. Also, as apparent from the foregoing, this invention makes handling of the cartridge very easy, because the cartridge of this invention is very compact, and further it is very easy to exchange sheets for new ones. Further, it enables a keyboard apparatus to maintain higher reliability because sheets, which sometimes curl up easily and change shape, are stored in a tray in natural conditions aligned in flat planes without rolling up or breaking or undergoing other various deformations.

Furthermore, as is apparent from the foregoing, it makes possible dealing with many sheets in one cartridge, because the sheets are stored in the tray in piles without occupying a large space. Also, it makes possible using many more sheets because many tag sets can be provided.

Many possible modifications will become apparent from the foregoing which are within the spirit of the invention. However, the foregoing disclosure is presented in an illustrative sense rather than in a limited sense and the appended claims are relied upon to define the scope of this invention.

What is claimed is:

1. A keyboard apparatus, comprising:
   key switch means having a set of item keys for performing data entry and having means associated with each item key for displaying a data item to be entered by the corresponding data key, said set of item keys being arranged in a display position, and a set of select keys for selecting sets of input data items corresponding to said item keys and to be displayed in said display means;
   a plurality of sheets on which respective sets of input data items are positioned in positions corresponding to the positions of said display means;
   a cartridge having a tray means for storing said sheets in piles and which is movable transversely of said cartridge means;
   cartridge holding means for holding said cartridge in a first position from which said tray means is movable transversely of said cartridge means to a position corresponding to said display position in which the input data items on the top sheet in said tray means are displayed in the corresponding display means;
   selecting means operable in response to said select keys for separating said sheets in said tray means into two groups and holding the sheets in the first group out of said tray means and leaving the sheets in the second group in said tray means; and translating means engagable with said tray means and operable in response to said select keys for moving said tray means from said position corresponding to said display condition to said first position and holding said tray means in said first position while said selecting means operates to release a previously held first group of sheets and allow them to return into said tray means and to separate and hold a new first group of sheets, and then moving said tray means back to said position corresponding to said display position.

2. An apparatus as claimed in claim 1 wherein said sheets each have tag means thereon and located along an edge of a sheet, said tag means being arranged in stepwise fashion in the order in which the sheets are stacked, and said selecting means comprises means for engaging said tag means on one of said sheets and moving said one tag means and said one sheet and the sheets above said one sheet as said first group of sheets out of said tray means and holding said first group of sheets out of said tray means.

3. An apparatus as claimed in claim 1 wherein said cartridge means comprises a casing having an open portion, said tray means being mounted in said casing for transverse movement out of said casing and being exposed through said open portion for being engaged by said translating means.

4. An apparatus as claimed in claim 1 in which said key switch means further has means associated with each select key for displaying the set of data entry items which is selected by the corresponding select key, and said cartridge is positioned in said cartridge holding means beneath said select keys and has the sets of data entry items thereon corresponding to the sheets in the cartridge and positioned for being displayed through corresponding display means for the select keys.

5. An apparatus as claimed in claim 1 in which in said tray means the end facing away from the end toward which said transverse movement takes place is open for giving access to said selecting means, and said tray means has guiding means thereon projecting into said open end for holding the sheets in said tray means during movement of said tray means from said first position to said position corresponding to said display position.

* * * * *